United States Patent [19]  [11] Patent Number: 4,728,728
Lin et al.  [45] Date of Patent: Mar. 1, 1988

[54] SULFONATED LIGNO-AMINODICARBOXYLATES AND PROCESS FOR MAKING SAME

[75] Inventors: Stephen Y. Lin, Wausau; Lin H. Hoo, Schofield, both of Wis.

[73] Assignee: Reed Lignin Inc., Rothschild, Wis.

[21] Appl. No.: 869,089

[22] Filed: May 30, 1986

[51] Int. Cl.$^4$ .............................................. C08H 5/02
[52] U.S. Cl. .................................................... 530/501
[58] Field of Search ......................................... 530/501

[56]  References Cited
U.S. PATENT DOCUMENTS 3,296,159  1/1967  Lissner ........................ 530/501 X
3,407,188  10/1968 Cavagna ....................... 530/501
3,671,428  6/1972  Kim ............................. 530/501 X
3,912,706  10/1975 Rachor et al. ................ 530/501 X Primary Examiner—Earl Nielsen
Attorney, Agent, or Firm—Andrus, Sceales, Starke & Sawall

[57] ABSTRACT

Disclosed herein are sulfonated ligno-aminodicarboxylic acid and the salts thereof of the formula

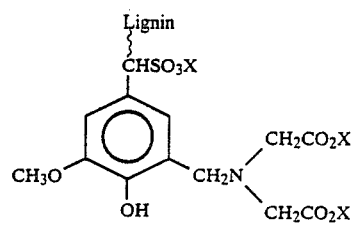

wherein X is an alkali cation, such as sodium, potassium, lithium, and ammonium, and Lignin denotes the polymeric sulfonated lignin material derived from commercial pulping of wood, straw, corn stalks, bagasse and the like. The dicarboxylic acid is made by a three-step process: (1) amination with ammonia and formaldehyde; (2) cyanomethylation with formaldehyde and sodium cyanide; and (3) hydrolysis of nitrile to carboxylic acid. The sulfonated ligno-aminodicarboxylic acid and its salts are useful as metal complexing agents.

16 Claims, No Drawings

SULFONATED LIGNO-AMINODICARBOXYLATES AND PROCESS FOR MAKING SAME

BACKGROUND OF THE INVENTION

This invention concerns dicarboxylates derived from sulfonated lignin material, the process for making said derivatives and, more particularly, the use of such dicarboxylates for metal complexing.

As used herein, the term "lignin" has its normal connotation, and refers to the substance which is typically recovered from alkali pulping black liquors, such as are produced in the kraft, soda and other well-known alkali pulping operations. The term "sulfonated lignin", as used in this specification, refers to the product which is obtained by the introduction of sulfonic acid groups into the lignin molecule, as may be accomplished by reaction of the lignin with sulfite or bisulfite compounds. As used herein, the term "lignosulfonate" refers to the reaction product of lignin which is inherently obtained during the sulfite pulping of wood, straw, corn stalks, bagasse and the like, and is a principal constituent of the spent sulfite liquor which is derived from that process. Finally, the phrase "sulfonated lignin material" encompasses not only the lignin and lignosulfonate reaction products herein above described, but also spent sulfite liquors, which materials may be further reacted, purified, fractionated, or the like, as may be appropriate for the particular material involved.

Numerous modifications have been made to sulfonated lignin material in order to improve certain properties, such as dispersing ability, flocculating ability, flame retardancy, thermoplasticity, tanning properties and the like. Although lignin derivatives with improved properties have been prepared by treatment of lignin, none of these derivatives has proven to have as great effectiveness in both dispersing the metal complexing properties as is desirable. This is particularly true with regards to the sequestering capacity of lignin for calcium, copper, iron, magnesium, manganese, zinc and other metals commonly encountered in the industry. For example, the catecholic groups in lignin and ferrous ions are known to form a blue color complex and a colorimetric technique based on the complex formation has been commonly used to determine the amount of catecholic structures in kraft lignin (see Falkehag et al. 1966 in "Lignin Structure and Reaction", Advances in Chemistry Series 59:75). U.S. Pat. No. 3,956,261 reveals a lignodicarboxylic acid made by reacting an alkali lignin or sulfonated lignin with epoxysuccinate which is claimed to be an effective metal complexing agent. Commercial lignin products which combine lignosulfonate with metal ions, such as Fe, Zn, Mg, Mn, are sold as micronutrients for agricultural applications. The amounts of complexed metals in the products are generally low. Some lignin sequestrants also exhibit the ability to enhance corrosion inhibition of certain industrial zinc formulations.

Polycarboxylic compounds are widely used as calcium complexing agents in detergent building, water treatment, metal cleaning and other applications. Among them, the most important are citric acid, ethylenediaminetetraacetic acid (EDTA) and nitrilotriacetic acid (NTA). A general structural feature of these compounds is that the polycarboxylate groups in a molecule are coupled with an electron-rich element, such as oxygen or nitrogen, in the manner depicted in the formula

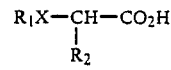

where $R_1$, $R_2$ = hydrogen, alkyl or aliphatic carboxylic group; and X = oxygen or nitrogen. Another common feature of these compounds is that they all lack a sulfonic acid group which is required to give water solubility under strongly acidic conditions or at high water hardness.

The invention described herein is a ligno-aminodicarboxylic acid of strong metal complexing ability and good water solubility. It is a derivative of sulfonated lignin material which is abundantly available from the spent liquors of wood pulping processes. By virtue of its unique performance characteristics, the product is particularly useful as a complexing agent for formulating concentrated metal solutions.

It is, therefore, the general object of this invention to provide a sulfonated ligno-aminodicarboxylic acid.

Another specific object of this invention is to provide a sulfonated lignin derivative which exhibits a strong metal complexing ability and good water solubility.

Still another object of this invention is to provide an effective process for producing the sulfonated ligno-aminodicarboxylic acid.

Other objects, features and advantages of this invention will be evident from the following detailed description.

SUMMARY OF THE INVENTION

It has now been found that certain of the foregoing and related objects of the present invention are readily obtained in a reaction product of a sulfonated lignin material containing 2 to 8 percent by weight of combined organic sulfur, about 0.5-3 millimoles of ammonia, 1.5-9 millimoles of formaldehyde, and 1-6 millimoles of sodium cyanide, per gram of lignin in the material. The chemical identity of the invention product is represented by the general formula

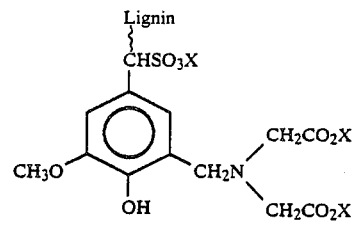

wherein X is an alkali cation, such as sodium, potassium, lithium, and ammonium, and Lignin denotes the polymeric sulfonated lignin material from which the aminodicarboxylate is derived.

DETAILED DESCRIPTION OF THE INVENTION

In essence, the process for making the dicarboxylate of the invention consists of three basic steps:
(1) Amination of sulfonated lignin material.

Sulfonated lignin material is reacted with ammonia and formaldehyde to form a Mannich amine of lignin. This reaction is one example of Mannich reaction, as described in detail in Blicke, *Organic Reaction* 1, 303–341(1942). The lignin Mannich amine is prepared by reacting the sulfonated lignin material with 0.5–3 millimoles, preferably 1–2 millimoles of ammonia and 0.5–3, preferably 1–2 millimoles of formladehyde per gram of said sulfonated lignin. A most satisfactory procedure comprises forming an aqueous solution of sulfonated lignin material at a solids concentration of 20–60%, preferably 30–50%, adjusting the pH of the solution to between 10 and 12, preferably 10.5 and 11.5 with an alkali; and mixing the alkaline lignin solution with the specified quantities of ammonia and formaldehyde at a temperature of 25° C. to 100° C., preferably 50°–75° C. for a period of 1 to 24 hours, perferably 4 to 6 hours.

(2) Reaction of lignin Mannich amine with formaldehyde and sodium cyanide.

This reaction, known as cyanomethylation of amine, is an example of the Strecker synthesis (see March, *Advanced Organic Chemistry: Reactions, Mechanisms and Structure*, 1968, p. 710). For the purpose of this invention, the best procedure is to react the lignin Mannich amine with 1–6 millimoles, preferably 2–4 millimoles of formaldehyde and 1–6 millimoles, preferably 2–4 millimoles of sodium cyanide per gram of said sulfonated lignin at a temperature of 25° C. to 70° C., preferably 35° C. to 60° C., for a period of time varying from 1 to 10 hours, preferably from 3 to 7 hours. The addition of sodium cyanide to a mixture of formaldehyde and lignin Mannich amine is an exothermic reaction, and the resultant heat will cause an increase in the temperature of the reaction mixture. In order to minimize the premature hydrolysis of cyanide to carboxylic acid, the temperature is controlled at or below about 60° C. by cooling. The product of the Strecker synthesis is a lignin nitrile.

(3) Hydrolysis of lignin nitrile.

The lignin nitrile is readily hydrolyzed to sulfonated ligno-aminodicarboxylate by heating at 90° C. to 100° C. for a period of 1 to 10 hours, preferably 2 to 5 hours, at an initial pH of 12 or above. The final pH of sulfonated ligno-aminodicarboxylate solution is usually in the range of 11.5–12.

In accordance with a preferred embodiment of the invention, the composition will utilize a lignosulfonate as the lignin material, which lignosulfonate may desirably be a desulfonated derivative such as one obtained by heating said lignosulfonate in alkaline solutions at an elevated temperature. In accordance with other embodiments, the lignin material employed will be a sulfonated lignin. In either case, the degree of sulfonation in said sulfonated lignin material will preferably be in the range of 2–8% by weight of organic sulfur per gram of lignin in the material.

In accordance with an alternative preferred embodiment of the method, the sulfonated lignin material is spent sulfite liquor solids which contain up to 50% by weight of sugar acids, inorganic salts, polysaccharides, and the like, and the balance being sodium lignosulfonate.

In certain embodiments, the sulfonated lignin material employed for the invention is a partially desulfonated lignosulfonate material obtained by heating spent sulfite liquor solids with alkali at a temperature of 170° C. to 220° C. The desulfonation reaction is accelerated by simultaneous aeration during heating. It is preferable for the purpose of the invention that this desulfonated lignosulfonate contains a minimum amount of 2% by weight of organic sulfur. An organic sulfur content below 2% substantially reduces the water solubility of ligno-aminodicarboxylate/metal complexes, and thus renders the invention products less desirable. One advantage of the desulfonation treatment, however, is an enhanced complexing ability for certain metals such as manganese and magnesium.

The alkaline hydrolyzed, partially desulfonated lignosulfonates employed for this invention are commercially available from various sources, and are usually most readily and conveniently obtained pursuant to the teachings of U.S. Pat. No. 2,491,832. According to said patent, lignosulfonate is oxidized and partially desulfonatd by passing oxygen (or air) through spent sulfite liquor which contains added sodium hydroxide and is maintained at about 165° C. for a time period of 45 minutes. Alternatively, a desulfonated lignosulfonate is prepared by heating the spent sulfite liquor at 200° C. to 220° C. in alkali without aeration (or oxygen injection).

In a series of reactions of lignin Mannich amine with formaldehyde and sodium cyanide, it was found that the sequence of addition of the two chemicals to the lignin amine is critical to minimizing the amount of detectable free cyanide above the reaction mixture. To keep the free cyanide to below 10 parts per million (ppm) for safety reasons, formaldehyde has to be added prior to sodium cyanide. If the reverse sequence is followed, the detectable free cyanide content easily exceeds 100 ppm, and can become a serious health hazard.

Exemplary of the efficacy of the present invention are the following examples, wherein all parts and percentages are on a weight basis, unless specified otherwise.

EXAMPLE ONE

A hardwood spent sulfite liquor was used, which contained (in percentages by solids weight) 60 sodium lignosulfonate and 17 reducing sugars, the remainder being inorganic salts, polysaccharides and the like. The lignosulfonate contained 8% organic sulfur. The liquor was reacted with sodium hydroxide at a temperature of 90° Centigrade for a period of 2 hours to revert substantially all of the sugars contained in the liquor to sugar acids. The reverted liquor, which had a pH of 10.7, contained 1,500 parts solids and 1,430 parts water; of the solids content of the liquor, 800 parts thereof comprised lignosulfonate and about 600 parts comprised organic sugar acids and inorganic salts. The lignosulfonate in the liquor was reacted with 51 parts of anhydrous ammonia and 90 parts of formaldehyde at 60° C. for 5 hours. At the end of the reaction period, pH of the reaction mixture was determined to be 10. After cooling to 40° C., into the mixture was added 180 parts of formaldehyde and subsequently 294 parts of sodium cyanide. The addition of the canide caused an exothermic reaction that raised the temperature to about 60° C. The temperature was maintained at 60° C. for 5 hours by additional heating, if necessary. Sodium hydroxide (60 parts) was then added and the mixture heated at 95° C. for 5 hours. Analyses of the final product gave: solids=48%; pH=11.9; viscosity at 25° C.=74 centipoises; and specific gravity=1.254.

EXAMPLE TWO

A hardwood spent sulfite liquor as in Example One was alkaline hydrolyzed, partially desulfonated by heating with 20 percent by weight of sodium hydroxide in a continuous reactor at 215° C. for 30 minutes. The thus treated liquor contained (by percentges) 50 sodium desulfonated lignosulfonate, 14 sugar acids and the reamining being inorganic salts, polysaccharides and the like. The lignosulfonate contained about 5.5% organic sulfur. The partially desulfonated spent sulfite liquor, which contained 1,500 parts solids and 1,650 parts water, was reacted with 51 parts of anhydrous ammonia and 90 parts of formaldehyde at 60° C. for 5 hours. At the end of the reaction period, pH of the reaction mixture was 10.6. After cooling to 40° C., into the mixture were added 180 parts of formaldehyde, followed by addition of 294 parts of sodium cyanide. The addition of the cyanide caused an exothermic reaction and the temperature of the reaction mixture increased to about 60° C. The temperature was maintained at 60° C. for 5 hours. Sodium hydroxide (60 parts) was then added and the mixture heated at 95° C. for 5 hours. The final product had the following analyses: solids=48.8%; pH=12.5; viscosity=98 centipoises; and specific gravity=1.298.

EXAMPLE THREE

An alkaline oxidized, hydrolyzed partially desulfonated lignosulfonate material produced according to the teaching of U.S. Pat. No. 2,491,832 was employed. The desulfonated lignosulfonate typically available from the commercial vanillin process wherein the spent sulfite liquor is oxidized with air (or oxygen) at 140° C. to 170° C., contained about 2.5% by weight of organic sulfur. The oxidized, hydrolyzed, partially desulfonated lignosulfonate (1,430 parts) was dissolved in 1,740 parts of water, and reacted with 49 parts of anhydrous ammonia and 86 parts of formaldehyde at 60° C. for 5 hours. After cooling to 40° C., into the mixture were added 172 parts of formaldehyde and 281 parts of sodium cyanide. After reacting at 60° C. for 5 hours, 57.5 parts of sodium hydroxide was added and heating was continued at 95° C. for 5 hours. The final product had the following analyses: solids=44%; pH=11.8; viscosity=360 centipoises; and specific gravity=1.238.

EXAMPLE FOUR

The ligno-aminodicarboxylates prepared according to Examples One, Two and Three are effective complexing agents for metals. The complexing efficiency was evaluated by two methods:
(1) Ion exchange chromatography In this test, a cation exchange resin, Dowex 50W-X8 from Polysciences Inc., Warrington, PA was employed. The resin (35 grams) was packed in a glass column of 1.2 cm diameter and 63 cm length. A solution (5 milliliters) containing one gram of a complexing agent and five metals, 0.0065 grams of zinc ($Zn^{++}$), 0.0056 grams of iron ($Fe^{++}$), 0.0055 grams of manganese ($Mn^{++}$), 0.0024 grams of magnesium ($Mg^{++}$) and 0.0064 grams of copper ($Cu^{++}$), was applied to the column and eluted with 450 milliliters of distilled water. The exchange capacity of the ion exchange resin employed was determined to be 16.4 millimoles of metal. The amounts of metals eluted from the column were determined by atomic absorption spectrophotometry and % metal complexing calculated by the following equation:

$$\% \text{ metal complexing} = \frac{C_e}{C_o} \times 100$$

where
$C_o$=concentration of metal in solution before application to the ion exchanger column
$C_e$=concentration of metal in solution after elution through the column.

In essence, ion exchange chromatography was designed to show the competitive complexing strength (or capacity) of a complexing agent relative to that of the ion exchange resin employed.
(2) Soil Test In this test, the soil occurring widely in central Wisconsin called Marathon silt loam was employed. This is well drained, dark brown soil of high porosity and good air permeability. The soil is dried at 105° C. overnight to about 5% moisture content before use. A micronutrient formulation containing the five metals commonly used in agriculture was prepared by dissolving 0.343 grams of $ZnSO_4.H_2O$, 1.267 grams of $MgSO_4.7H_2O$, 0.385 grams of $MnSO_4.H_2O$, 0.622 grams of $FeSO_4.7H_2O$, and 0.491 grams of $CuSO_4.5H_2O$ in 250 milliliters of a chelant solution (containing 2.5 grams of solids) at pH 4.5. Five milliliters of the formulation was mixed with 45 milliliters of distilled water and 50 grams of the Marathon silt loam under agitation overnight. After centrifugation, 5 milliliters of the clear supernatant was diluted with 95 milliliters of distilled water and the concentration of metals determined by atomic absorption spectrophotometry. The % metal complexing was calculated as follows:

$$\% \text{ metal complexing} = \frac{C_i}{C_o} \times 100$$

where
$C_o$=concentration of metals in solution before application to soil
$C_i$=concentration of metal in solution after mixing with soil.

This test was designed to measure the ability of a complexing agent to keep metals in solution in the soil and thus render them available to the plants. It can be seen from the test data of Table I that the sulfonated ligno-aminodicarboxylates prepared according to Examples One, Two and Three have a much improved metal complexing capacity over unmodified lignosulfonate and are superior to two representative commercially available lignosulfonate and kraft lignin products of good metal complexing properties, e.g., Kelig 32 and Reax 88B. The products of the present invention compare favorably with the two representative non-lignin complexing agents, e.g. EDTA and citric acid.

TABLE I

| | METAL COMPLEXING TESTS | | | | | | | | | |
|---|---|---|---|---|---|---|---|---|---|---|
| | % Metal Complexing | | | | | | | | | |
| Complexing | Method 1 | | | | | Method 2 | | | | |
| Agent* | $Mn^{++}$ | $Cu^{++}$ | $Mg^{++}$ | $Fe^{++}$ | $Zn^{++}$ | $Mn^{++}$ | $Cu^{++}$ | $Mg^{++}$ | $Fe^{++}$ | $Zn^{++}$ |
| Unmodified Lignosulfonate | 0 | 97 | 8 | 98 | 27 | 7 | 0 | 29 | 0 | 0 |
| Example One | 67 | 100 | 1 | 100 | 99 | 26 | 18 | 70 | 9 | 21 |
| Example Two | 78 | 100 | 4 | 99 | 100 | 29 | 21 | 71 | 8 | 20 |

TABLE I-continued
METAL COMPLEXING TESTS

| Complexing | % Metal Complexing | | | | | | | | | |
|---|---|---|---|---|---|---|---|---|---|---|
| | Method 1 | | | | | Method 2 | | | | |
| Agent* | $Mn^{++}$ | $Cu^{++}$ | $Mg^{++}$ | $Fe^{++}$ | $Zn^{++}$ | $Mn^{++}$ | $Cu^{++}$ | $Mg^{++}$ | $Fe^{++}$ | $Zn^{++}$ |
| Example Three | 90 | 100 | 5 | 100 | 98 | 17 | 18 | 63 | 7 | 21 |
| EDTA | 96 | 100 | 89 | 100 | 100 | 15 | 65 | 57 | 20 | 100 |
| Citric Acid | 78 | 96 | 65 | 84 | 93 | 15 | 0 | 55 | 7 | 8 |
| Reax 88B | 0 | 98 | 7 | 99 | 39 | 14 | 4 | 63 | 5 | 3 |
| Kelig 32 | 0 | 96 | 6 | 100 | 10 | 14 | 5 | 63 | 5 | 4 |

*Reax 88B - A commercially available sulfonated kraft lignin product from Westvaco Corp.
Kelig 32 - Modified lignosulfonate from Reed Lignin Inc.

EXAMPLE FIVE

This example demonstrates the improvement achieved with the invention products was made possible by an adduct formation between sulfonated lignin material and aminocarboxylate. An aminocarboxylate was prepared separately by reacting 41 parts of anhydrous ammonia in 800 parts of water, with 235 parts of sodium cyanide and 216 parts of formaldehyde at 60° C. for 5 hours. At the end of the reaction period, 48 parts of sodium hydroxide was added and the mixture heated at 95° C. for 5 hours to hydrolyze the nitrile to aminocarboxylate. The ratio of the chemical ingredients used and reaction conditions in making the aminocarboxylate were identical with that used in Example One for making ligno-aminodicarboxylate. The aminocarboxylate was blended with the same sulfonated lignin material as employed in Example One at the same ratio and evaluated for metal complexing capacity. The data in Table II clearly show that the invention ligno-aminocarboxylate is an improved sulfonated lignin material and its outstanding metal complexing capacity cannot be achieved by merely blending the unmodified sulfonated lignin material and the aminocarboxylate.

TABLE II
PERFORMANCE COMPARISON BETWEEN CHEMICAL ADDUCT AND PHYSICAL BLEND

| | % Metal Complexing by Ion Exchange Chromatography* | | | | |
|---|---|---|---|---|---|
| Sample | $Mn^{++}$ | $Cu^{++}$ | $Mg^{++}$ | $Fe^{++}$ | $Zn^{++}$ |
| Chemical Adduct (Example One) | 67 | 100 | 1 | 100 | 99 |
| Physical Blend (Example Five) | 2 | 100 | 0 | 76 | 83 |

*Method 1 of Example Four.

EXAMPLE SIX

The water solubility of ligno-aminodicarboxylate is important in application areas where it is blended with a large amount of metal salts. This is particularly true in formulating micronutrient products used in agriculture. This example illustrates the effect of the degree of sulfonation on the performance characteristics of sulfonated ligno-aminodicarboxylate. Thus, 20 parts of a ligno-aminodicarboxylate was dissolved in 52 parts of water, and pH of the solution was adjusted to 6 with 98% sulfuric acid. Zinc sulfate (27.5 parts) was added slowly to the solution under vigorous agitation. After all the metal sulfate had been added, the micronutrient formulation (containing 10% zinc) was left to stand undisturbed for 24 hours. The formulation was then filtered through Whatman No. 4 filter paper and the amount of insolubles in percent was determined. The data in Table III show that as the degree of sulfonation of sulfonated lignin material decreases, the viscosity and amount of insolubles of the 10% zinc micronutrient formulation also tend to increase. For the micronutrient application, the degree of sulfonation of the ligno-aminodicarboxylate should be as high as possible, but preferably and practically in the range of 2 to 8% sulfur by weight of sodium lignosulfonate.

TABLE III
DEGREE OF SULFONATION OF SULFONATED LIGNO-AMINODICARBOXYLATE vs. PERFORMANCE PROPERTIES IN MICRONUTRIENT FORMULATION

| Sample | Degree of Sulfonation (m mol/g)* | Micronutrient Formulation Property** | |
|---|---|---|---|
| | | Viscosity (cps) | % Insolubles |
| Example One | 2.5 | 41 | 25.8 |
| Example Two | 1.7 | 140 | 70.4 |
| Example Three | 0.78 | 190 | 85 |

*Degree of sulfonation in millimoles per gram of sodium lignosulfonate.
**Solids concentration of formulation ≃ 45%. Upon dilution of micronutrient formulation (which is always done prior to application of the formulation to agricultural crops), all insolubles dissolve in water to form a clear solution.

While the invention has been described and illustrated herein by employing various specific materials, methods and examples, it is understood that the invention is not restricted to the particular materials, combination of materials and the methods selected for that purpose. Various modes of carrying out the invention are contemplated as being within the scope of the following claims particularly pointing out the distinctly claiming the subject matter which is regarded as the invention.

What is claimed is:

1. As a composition of matter, a sulfonated lignoaminodicarboxylate comprising a reaction product of a sulfonated lignin material containing 2 to 8 percent by weight of combined organic sulfur, and about 0.5-3 millimoles of ammonia, about 1.5-9 millimoles of formaldehyde, and about 1-6 millimoles of sodium cyanide, per gram of lignin in said material, and of the general formula

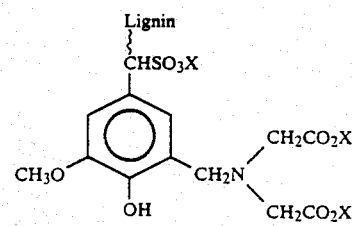

wherein X is an alkali metal or ammonium cation, and Lignin is a polymeric sulfonated lignin material.

2. The composition of claim 1 wherein said cation is selected from the group consisting of sodium, potassium, lithium, and ammonium.

3. The composition of claim 1 wherein said sulfonated lignin material is lignosulfonate, and wherein said amount of organic sulfur is about 2 to 8 percent.

4. The composition of claim 1 wherein said sulfonated lignin material is a spent sulfite liquor.

5. The composition of claim 4 wherein said liquor is substantially desugared, and is unpurified.

6. The composition of claim 1 wherein said sulfonated lignin material is an alkaline hydrolyzed, partially desulfonated lignosulfonate, and wherein said amount of organic sulfur is about 4 to 6 percent.

7. The composition of claim 1 wherein said sulfonated lignin material is an alkaline hydrolyzed, oxidized, partially desulfonated lignosulfonate, and wherein said amount of organic sulfur is about 2 to 4 percent.

8. The composition of claim 1 wherein said sulfonated lignin material is a sulfonated lignin, and wherein said amount of organic sulfur is about 2 to 7 percent.

9. In a method for production of a ligno-aminocarboxylate, the steps comprising:

(1) forming an aqueous reaction mixture of a sulfonated lignin material, about 0.5–3 millimoles of ammonia and about 0.5–3 millimoles of formaldehyde, per gram of said sulfonated lignin, and reacting the mixture at a pH of about 10.5 to 11.5 at about 50° C. to 75° C. for about 4 to 6 hours to form a lignin Mannich amine;

(2) reacting said lignin Mannich amine with about 1–6 millimoles of formaldehyde and about 1–6 millimoles of sodium cyanide per gram of sulfonated lignin at about 25° C. to 70° C. for about 1 to 10 hours to form a lignin nitrile; and (3) hydrolyzing said lignin nitrile to ligno-aminodicarboxylate by heating the lignin nitrile solution at an initial pH above about 12 and at a temperature of about 90° C. to 100° C.

10. The method of claim 9 wherein said sulfonated lignin material is a lignosulfonate, and wherein said amount of organic sulfur is about 2 to 8 percent.

11. The method of claim 9 wherein said sulfonated lignin material is a spent sulfite liquor.

12. The method of claim 11 wherein said liquor is substantially desugared, and is unpurified.

13. The method of claim 9 wherein said sulfonated lignin material is an alkaline hydrolyzed, partially desulfonated lignosulfonate, and wherein said amount of organic sulfur is about 4 to 6 percent.

14. The method of claim 9 wherein said sulfoanted lignin material is an alkaline hydrolyzed, oxidized, partially desulfonated lignosulfonate, and wherein said amount of organic sulfur is about 2 to 4 percent.

15. The method of claim 9 wherein said said sulfonated lignin material is a sulfonated lignin, and wherein said amount of organic sulfur is about 2 to 7 percent.

16. The method of claim 9 wherein the addition of formaldehyde precedes that of sodium cyanide.

* * * * *